Oct. 8, 1940.         R. V. PROCTOR         2,217,292
LINER SEGMENT
Filed June 28, 1939
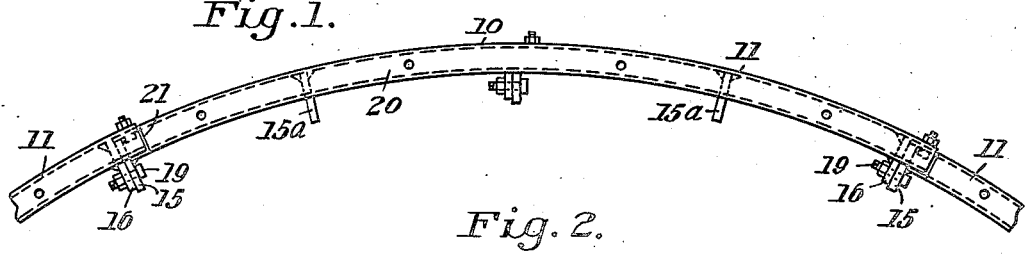
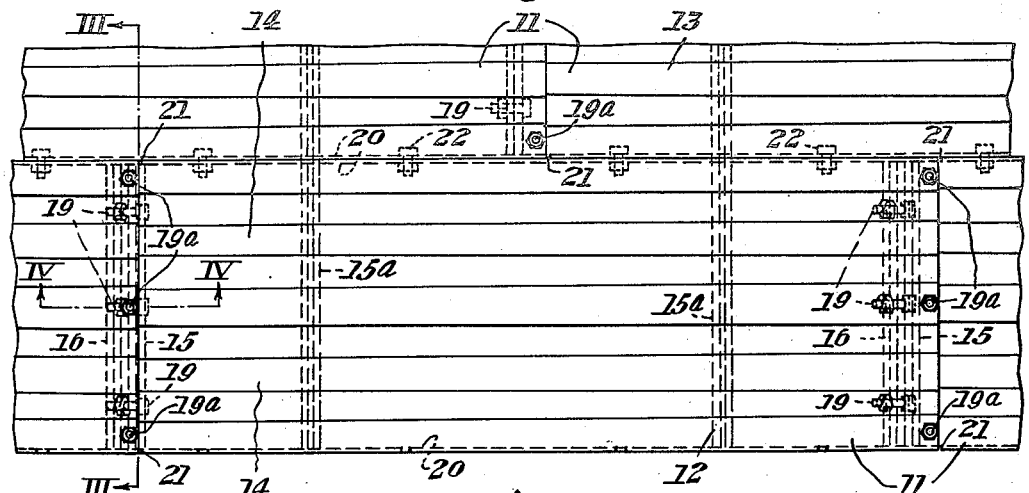
INVENTOR
Robert V. Proctor Patented Oct. 8, 1940

2,217,292

UNITED STATES PATENT OFFICE 2,217,292

LINER SEGMENT

Robert V. Proctor, Youngstown, Ohio, assignor to The Commercial Shearing & Stamping Company, Youngstown, Ohio, a corporation of Ohio Application June 28, 1939, Serial No. 281,545

4 Claims. (Cl. 61—45)

This invention relates to linings for earth borings and in particular to a liner segment adapted to be formed from steel plate and to be assembled end to end with other similar segments forming continuous lining rings. Such rings are assembled side by side in a manner to form a complete lining.

Numerous forms of liner segments have been proposed heretofore and it is the principal object of my invention to improve upon the segments which have been used previously both from the standpoint of economy of manufacture and ease and convenience in erection, while at the same time providing a segment of ample strength to support the load to which linings are usually subjected.

Linings for earth borings are subject to certain well defined forces, such as ring thrust, ring bending, bending of segments, etc. Ring thrust is the circular thrust going around the ring setting up compression stresses in the metal. This ring thrust is distributed over the sectional area of the segment and must be transmitted across the joints between the segments of each ring. Bending is caused by unequal loading of the ring and is resisted by the section modulus of the segment. The joints between segments of each ring must be strong enough to withstand the bending force. Staggering of the joints in the adjacent courses is of assistance in this respect, each course acting as a splice for the adjacent course. Local bending of individual segments is resisted by the section modulus of the segments taken circumferentially of the lining. It will be seen, therefore, that the strength of the joints is of extreme importance.

In a preferred form of the invention, my liner segment comprises a curved plate having stiffening corrugations extending therealong, preferably, though not necessarily, throughout the entire length thereof. End walls extend inwardly from the plate adjacent the ends thereof in one form of the invention, one of said walls being located substantially at one end of the plate, the other being spaced inwardly from the other end thereof. Securing means such as bolts passing through the end walls connect adjacent plates rigidly together. One end of each segment is overlapped by one end of an adjacent segment. These structural features provide the strength necessary to resist the forces above mentioned. The accompanying drawing illustrates a preferred embodiment. In the drawing:

Figure 1 is a partial side elevation of a lining composed of segments of the preferred form;

Figure 2 is a partial plan view thereof;

Figure 3 is a sectional view taken along the line III—III of Figure 2;

Figure 4 is a sectional view taken along the line IV—IV of Figure 2;

Figures 5 and 6 show adjacent segments in section as in Figure 4, but separated from each other instead of connected together; and Figure 7 is a partial side elevation of one end of the segment to an enlarged scale.

Referring in detail to the drawing, a lining for a tunnel or the like in accordance with the invention is indicated generally at 10. The lining is composed of segments 11 assembled end to end to form rings such as indicated at 12 and 13. These rings are built up in side by side relation to the desired length within the tunnel or other boring.

The segments 11 are formed from steel plate and are provided with corrugations 14 which preferably extend the full length of the plates. As shown in Figure 1, each segment includes a skin plate curved to the desired radius and has end walls 15 and 16 extending inwardly therefrom. Both end walls are shaped to conform to the corrugations of the plate as shown in Figure 3 and are welded to the plate as at 17. As shown in Figure 6, the end wall 15 is welded to the skin plate flush with the end thereof. The end wall 16, however, as shown in Figure 5, is welded to the skin plate in a position spaced inwardly from the other extreme end thereof. By virtue of this position of the end wall 16, one end of each segment (the right hand end in the drawing) overhangs the ends of the adjacent segment as at 18 in Figure 4. The end walls are provided with alined holes adapted to receive connecting bolts 19 by which the abutting ends of two adjacent segments may be drawn firmly together and rigidly connected. The rigidity of this connection provides sufficient strength in the completed lining to withstand the stresses to which it is normally subject and makes each ring of the lining self-supporting as it is erected, the connection between segments being such that stress applied to one segment is communicated across the joints between it and adjacent segments to the remainder of the ring. The end-to-end joint shown is 100% efficient in transmitting thrust around the ring. Bolts 19a traversing the lapped ends of the segments make the joint highly efficient also in resistance to forces tending to cause bending of the rings. The overlapping portion 18 of each segment provides a tight joint between the ends of adjacent segments to prevent infiltration therebetween.

Intermediate transverse reinforcing members 15a may be welded to the segments to provide additional resistance to bending.

In addition to the end walls 15 and 16, the segment has side walls 20 which may conveniently be formed by bending down the edges of the plate forming the body of the segment. Because of the shape of the corrugations 14, the lapped portions of adjacent plates will nest closely as shown in Figure 3. Since the side walls of plates assembled in end-to-end relation are in the same plane, however, portions of both side walls of each segment are cut out adjacent the end wall 15, as indicated at 21, to receive the overhanging side walls of the adjacent segment, as shown in Figure 4. The side walls are also provided with bolt holes whereby each ring may be connected to the adjoining rings by bolts 22.

It will be apparent from the foregoing description that the segment shown in the drawing makes it possible at relatively low cost to provide a strong, rigid lining for earth bores characterized by tight joints and relatively light weight. The facility with which the lining may be erected is a further important advantage because the work of assembly is performed within the lining where working space is very limited.

While I have illustrated and described herein only a preferred form of the invention, it will be understood that various other changes in the invention disclosed may be made without departing from the spirit thereof or the scope of the appended claims.

I claim:

1. A liner segment comprising a curved plate adapted to be assembled with other like plates to form a ring, a plurality of such rings disposed side by side forming a lining, said plate having walls extending inwardly therefrom adjacent each end, one of said end walls being disposed in alinement with an end of said plate, the other end wall being disposed inwardly of the other end of the plate, said plate also having side walls, said side walls being cut away at one end to permit mating engagement of adjacent segments.

2. A liner segment comprising a curved skin plate, and end walls extending inwardly from adjacent each end thereof, one end wall being spaced inwardly from the adjacent end of the skin plate, whereby when segments are assembled end to end with their end walls abutting, an end of the skin plate of one segment overhangs the adjacent end of the skin plate of the next segment.

3. In a lining structure, a plurality of curved segments assembled end to end, each segment including a skin plate and being so disposed that an end of the skin plate of one segment overlaps the end of the skin plate of the next segment, said segments having end walls extending inwardly therefrom, the end walls of adjacent segments abutting each other when the plates are assembled, and means securing said walls together.

4. In a lining structure, a plurality of curved segments assembled end to end, each segment including a skin plate and being so disposed that an end of the skin plate of one segment overlaps the end of the skin plate of the next segment, said segments having end walls extending inwardly therefrom, the end walls of adjacent segments abutting each other when the plates are assembled, and means extending through the lapped ends of adjacent segments for securing them together.

ROBERT V. PROCTOR.